A. W. WHEATON.
CUTTING UTENSIL.
APPLICATION FILED DEC. 18, 1915.
1,200,284.
Patented Oct. 3, 1916.
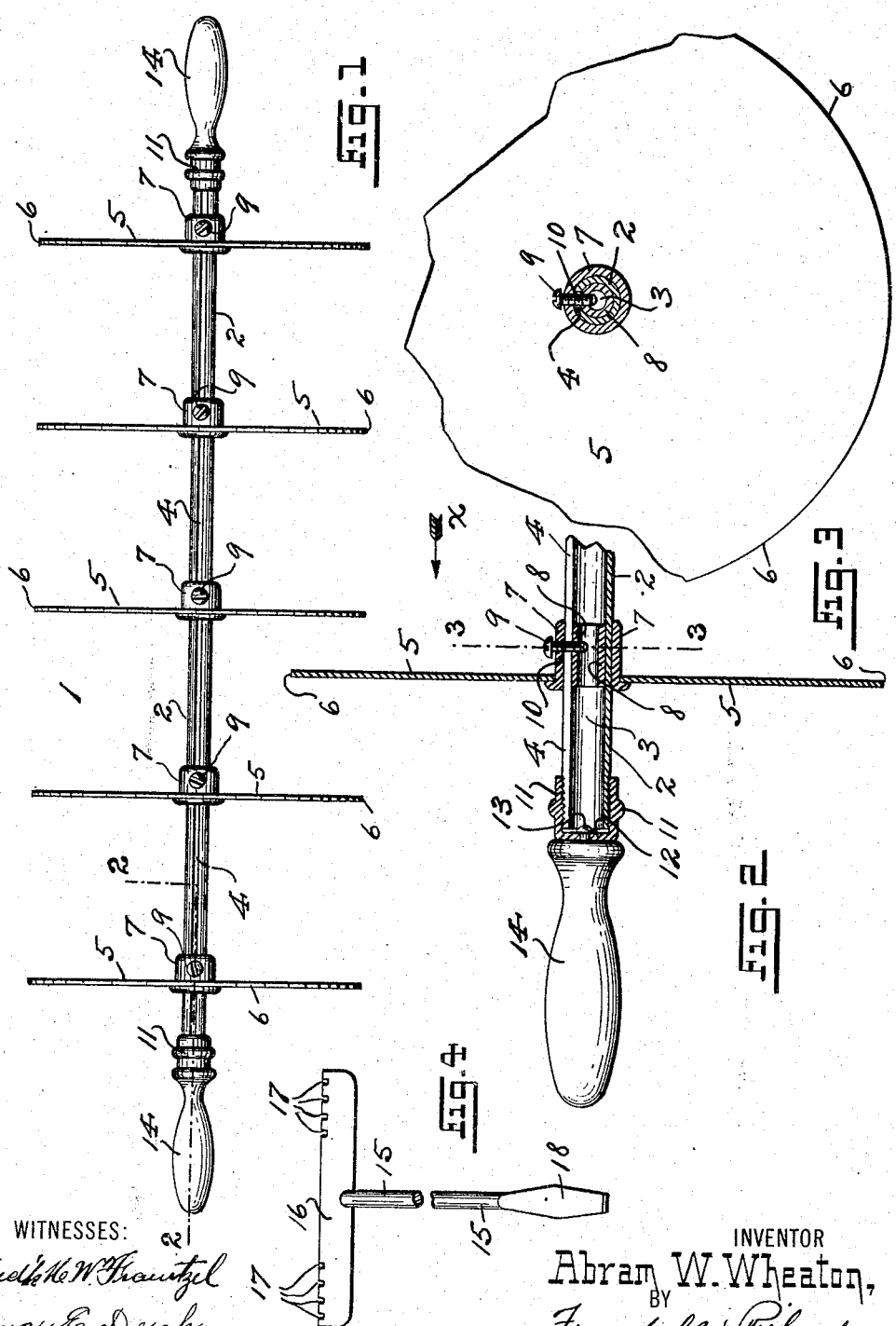
WITNESSES:
INVENTOR
Abram W. Wheaton,
BY
ATTORNEYS

UNITED STATES PATENT OFFICE.

ABRAM W. WHEATON, OF NEWARK, NEW JERSEY.

CUTTING UTENSIL.

1,200,284.  Specification of Letters Patent.  Patented Oct. 3, 1916.

Application filed December 18, 1915. Serial No. 67,492.

*To all whom it may concern:*

Be it known that I, ABRAM W. WHEATON, a citizen of the United States, residing at Newark, in the county of Essex and State of New Jersey, have invented certain new and useful Improvements in Cutting Utensils; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in cutting utensils; and, the invention relates, more particularly, to a novel device or utensil in the form of a rotary cutting device adapted in its character for many uses, such, for example, as cutting and forming dough masses, noodles, or other similar culinary purposes, or the same may be adapted for cutting strips, bands and pieces out of proper materials in various manufacturing arts.

The present invention has for its principal object to provide a novel, cheap and simple construction of rotary cutting device for purposes above mentioned, which comprises a plurality of adjustable cutting disks or knife elements mounted upon a carrying member, the latter having suitable handle-portions at its ends whereby said carrying-member and its cutting disks or knife elements may be rolled or rotated with pressure upon the material to be cut in the manner of using an ordinary rolling-pin, thereby causing the cutting-disks or knife elements to penetrate progressively the material to be cut as they roll forward over and through the same.

Another object of this invention is to provide a novel construction of carrying member upon which the circular cutting disks or knife elements may be adjusted relatively with respect to one another to space the same any desired distance apart, combined with a novel means for rigidly binding said cutting disks or knife elements in adjusted position and free from liability or tendency to shift laterally or wabble out of their true perpendicular plane when in use.

Other objects of this invention, not at this time more particularly enumerated, will be clearly understood from the following detailed description of the present invention.

With the various objects of the present invention in view, the same consists, primarily, in the novel rotary cutting device hereinafter set forth; and, the invention consists, furthermore, in the novel arrangements and combinations of the various devices and parts, as well as in the details of the construction of the same, all of which will be more fully described in the following specification and then finally embodied in the claims which are appended to and which form an essential part of this specification.

The invention is clearly illustrated in the accompanying drawings, in which:—

Figure 1 is a side elevation of the novel rotary cutting device made according to and embodying the principles of my present invention. Fig. 2 is a detail fragmentary longitudinal vertical section of the same, taken on line 2—2 in said Fig. 1, the same being drawn on an enlarged scale. Fig. 3 is a detail cross-section of the same taken on line 3—3 in said Fig. 2, looking in the direction of the arrow $x$. Fig. 4 is a face view of a tool having a spacer member adapted to be used to space said knife elements or cutting disks equally from one another in the operation of adjusting the same on the carrying member to cut the desired width of material, said tool having in addition a screw-driver portion to be used upon the locking screws of the said knife elements or cutting disks.

Similar characters of reference are employed in all of the above described views, to indicate corresponding parts.

Referring now to the said drawings the reference character 1 indicates the complete novel rotary cutting device made according to and embodying the principles of my present invention, the same comprising a carrying-member consisting of a hollow tubular-portion 2 providing the interior passage 3, said tubular-portion being provided with a longitudinally extending slot or opening 4 extending preferably throughout its entire length.

The reference character 5 indicates the cutting disks or knife elements, the same being of circular or disk-like form, their circumferential edges 6 providing the cutting edges thereof. Each cutting disk or knife element 5 is provided with a centrally disposed tubular hub-portion 7 rigidly connected therewith. Said hub-portions 7 are adapted to slide, exteriorly, over said tubular-portion 2, the sliding fit of the same being snug and preferably free from lateral play, yet loose enough to freely permit said hub-portions 7 to be slid longitudinally upon said tubular-portion 2 so as to permit of adjusting or spacing said cutting-disks or knife elements toward or away from each other a desired distance. Arranged within the tubular passage 3 of said tubular-portion 2, so as to be slidable therein, are a series of binding or clamping elements 8, the same corresponding in number to the number of cutting disks or knife elements 5. The reference character 9 indicates a locking-screw, the threaded shank 10 of which passes through said hub-portion 7 of each cutting-disk or knife element, and thence through said slot or opening 4 of said tubular-portion 2, so that the same will screw into a binding or clamping element 8. The said hub-portions 7 of said cutting disks or knife elements 5 are of sufficient longitudinal extent to provide a firm bearing or contact with said tubular-portion 2, and in like manner said binding or clamping elements are of corresponding longitudinal extent so as to provide equally firm bearing or contact with the inside surface of said tubular-portion 2. When it is desired to tighten or lock said cutting disks or knife elements 5 in desired adjusted positions, relative to each other, upon said tubular portion 2, the locking-screws 9 thereof are tightened with the effect of drawing said clamping or binding elements 8 tightly against the inside surface of said tubular portion 2 and simultaneously forcing the hub-portions 7 tightly against the outside surface of said tubular portion 2, and consequently binding or clamping a portion of said tubular-portion 2 with strong frictional engagement between the said clamping or binding elements 8 and said hub-portions 7. In this manner the cutting disks or knife elements are securely held in desired adjusted position upon the tubular portion 2 in such a way that all danger of shifting on the latter or other free movement is eliminated, and at the same time the clamping action of the above described parts so firmly fixes the hub-portions that any looseness or play likely to result in wabbling of the cutting edges of cutting disks or knife elements, or other lateral swaying tending to permit said cutting disks or knife elements to move out of their normal true perpendicular plane is entirely prevented. The free ends of said tubular-portion 2 are provided with screw-threads upon which are screwed end-caps 11, to the walls 12 of which are secured by means of rivets 13, or any other suitable fastening devices, longitudinally and outwardly extending handle-members 14, the latter may be so mounted as to turn freely relative to said tubular-portion 2 if such arrangement is desired.

From the above description it will be readily understood that my present invention provides an exceedingly simple, strong, durable and efficient rotary cutting device, the cutting disks or knife-elements of which can readily be adjusted and spaced any desired distance apart and then firmly fixed in such adjusted relation, so that by rolling the cutting edges 6 thereof through a mass of dough or other material, strips thereof of any desired width may be readily and quickly cut, and those strips again cut crosswise to form pieces of desired size, such as may be used for purposes of baking rolls, biscuits, cookies, crackers, etc., when the cutting device is used as a culinary instrument in the aid of making such articles of food. As a convenience to the user of my novel cutting device, I have provided a tool, as illustrated in Fig. 4 of the accompanying drawings, which is designed to serve both as a spacing instrument for equally spacing the cutting disks or knife elements when adjusting the same, and as a means for manipulating the locking-screws 9. To this end said tool has a shank 15 at one end of which is a laterally extending head or spacer-device 16 provided in its outer marginal edge with graded pairs of spacing notches 17, each pair of which represents a given spacing distance. By applying the members of a given pair of such notches 17 to the edges of a pair of adjacent cutting disks or knife elements, that is by shifting the latter until their distance apart registers the same with the said pair of spaced notches, the said cutting disks or knife elements may be quickly and accurately, one after another, spaced apart, so that they will all be equally spaced one from another. Connected with the opposite end of said shank 15 is a screw-driver blade 18, or corresponding device, adapted for use in manipulating the said locking-screws 9 to clamp said cutting disks or knife elements in the spaced relation upon the carrying member previously attained.

I am aware that changes may be made in the general arrangements and combinations of the several devices and parts as well as in the details of the construction of the said parts, without departing from the scope of the present invention as set forth in the foregoing specification, and as defined in the claims which are appended thereto. Hence, I do not limit my invention to the exact arrangements and combinations of the various devices and parts as described in the said specification, nor do I confine myself to the exact details of the construction of the said parts as illustrated in the accompanying drawings.

I claim:—

1. In a device of the kind described a slotted tubular carrying-member, a plurality of independently adjustable circular cutting knives having hub-portions slidable longitudinally upon said carrying member, means associated with the hub-portion of each cutting knife, located within and concentric with said carrying-member for gripping the latter, and means extending through said hub-portion, said carrying member and said gripping means, for moving said gripping means into holding relation to said carrying-member.

2. In a device of the kind described a slotted tubular carrying-member, a plurality of independently adjustable circular cutting knives having hub-portions slidable longitudinally upon said carrying member, means associated with the hub-portion of each cutting knife, located within and concentric with said carrying-member for gripping the latter, means extending through said hub-portion, said carrying member and said gripping means, for moving said gripping means into holding relation to said carrying-member, and longitudinally and outwardly extending handle-members connected with the opposite ends of said carrying-member.

3. In a device of the kind described a slotted tubular carrying-member, a plurality of independently adjustable circular cutting knives having hub-portions slidable longitudinally upon said carrying-member, binding or clamping elements concentric with and slidable within said carrying-member, a locking-screw passing through each hub-portion and through said slot of said carrying-member and screwed into a corresponding binding or clamping element to draw the latter tightly against the inner surface of said carrying-member and thereby clamp said carrying-member immovably between said hub-portion and binding or clamping element to immovably secure said cutting knives in relative spaced adjustment upon said carrying-member.

4. In a device of the kind described a slotted tubular carrying-member, a plurality of independently adjustable circular cutting knives having hub-portions slidable longitudinally upon said carrying-member, binding or clamping elements concentric with and slidable within said carrying-member, a locking-screw passing through each hub-portion and through said slot of said carrying-member and screwed into a corresponding binding or clamping element to draw the latter tightly against the inner surface of said carrying-member and thereby clamp said carrying-member immovably between said hub-portion and binding or clamping element to immovably secure said cutting knives in relative spaced adjustment upon said carrying-member, and longitudinally and outwardly extending handle-members connected with the opposite ends of said carrying-member.

5. In a device of the kind described a slotted tubular carrying-member, a plurality of independently adjustable circular cutting knives having hub-portions slidable longitudinally upon said carrying-member, binding or clamping elements slidable within said carrying-member, a locking-screw passing through each hub-portion and through said slot of said carrying-member so as to screw into a corresponding binding or clamping element to draw the latter tightly against the inner surface of said carrying-member and thereby clamp said carrying-member immovably between said hub-portion and binding or clamping element to immovably secure said cutting knives in relative spaced adjustment upon said carrying-member, end-caps secured to the ends of said carrying-member, and longitudinally and outwardly extending handle-members secured to each end-cap at the opposite ends of said carrying-member.

In testimony, that I claim the invention set forth above I have hereunto set my hand this 14th day of December, 1915.

ABRAM W. WHEATON.

Witnesses:
FREDK. C. FRAENTZEL,
FRED'K. H. W. FRAENTZEL.